UNITED STATES PATENT OFFICE.

CHARLES J. PATTON, OF KEYSTONE, SOUTH DAKOTA.

MANUFACTURE OF MICA AND MICA SLATE.

1,338,393.          Specification of Letters Patent.     Patented Apr. 27, 1920.

No Drawing.      Application filed May 11, 1914. Serial No. 837,881.

*To all whom it may concern:*

Be it known that I, CHARLES J. PATTON, a citizen of the United States, residing at Keystone, in the county of Pennington and State of South Dakota, have invented new and useful improvements in the use and manufacture of mica and mica slate in the manufacture of certain hereinafter described articles and products, of which the following is a specification.

This invention relates to the manufacture of spring shoe and boot heels, boot, shoe and moccasin soles, insoles, mattresses, upholstering for furniture, fireless cookers, stove pads, refrigerators, egg crates, filling horse collars, collar pads, back pads, saddles and saddle pads; electric, water, heat and cold proof gloves, mittens, cloth and like materials for garments, head wear, tentings, awnings, roofing and paints; pillows, beds, cushions, carpets, rugs, bed spreads, quilts and coverings by the use of mica, or mica slate, specially prepared and manufactured from the natural plate mica and mica slate, separate or in combination with other materials,—mica being the principal, or one of the principal ingredients in the manufacture of the articles aforesaid.

The combining materials heretofore referred to in said manufactures are rubber, rubber glue, rubber in solution, wood, paper and leather pulp, asphaltum, products of petroleum and fish glue. These combining materials are to be used with pure mica plates, shredded and ground mica containing but a small per cent. of silica, and mica slate, in but sufficient proportions to cause the mica plates and particles to adhere to each other, with or without pressure, as desired to produce the desired manufactured article. In the process of manufacturing the foregoing articles I proceed practically as follows, to-wit:

1st. In the manufacture of shoe and boot heels, shoe and moccasin soles, and insoles, I use whole plate mica, (containing as little silica as possible) split in thin sheets for outside covering with shredded or ground mica (or mica slate, if greater resistance is required) as a filler in combination with sufficient of the above named combining material (such material to be selected as to its especial fitness in use in the article being manufactured) to cause the mica plates and particles to adhere to each other, with or without pressure, when placed in the respective molds, forms, receptacles and coverings, the component parts of the combined material being governed by the character and use of the manufactured article which can not now be definitely stated.

For spring heels I also use the mica combination material in hollow frames (or skeletons) composed of rubber, leather, wood or paper pulp, under pressure, with or without sheet mica, outside the filler. Also, I make heels of plate mica in alternate layers with and without the filler and held together with aforesaid adhesives, pegs or nails and with or without rubber or leather cap. I also, manufacture insoles from pure shredded or ground mica filler inclosed in cloth, leather, canvas, felt or other suitable material casing, with and without said adhesive materials, and in "plates."

2nd. In the manufacture of mattresses, upholstering, pillows, beds, cushions, bedding, gloves, horse collars, pads, saddles, and saddle pads, I use pure shredded or ground mica as a filler, with and without adhesive materials, in the proper casings, receptacles or envelop for the articles to be manufactured, and therein follow the general method of manufacture thereof now used with other filler materials.

The definition of plate mica, as herein used, is the natural mica in sheets or plates, split by hand or machinery from the original "books." Shredded mica is sheet mica specially prepared by being bruised, crushed, crumpled and shredded (not cut or ground) by hand or machinery, or both, and thereby reduced to the sized particles, resilience and elasticity desired for a special use and purpose. Ground mica, in general, is mica pulverized by machinery into practically its smallest component parts without destroying its natural qualities and usefulness.

Mica slate is slate carrying a high percentage of mica with silica, etc., and is easily ground by machinery to a powder. The properties and qualities of mica as a non-conductor of heat, water and electricity, and resilient and sanitary nature are well known, but its uses, qualities and benefits when manufactured and combined as heretofore specified, I claim, to be new and useful.

1. The herein described resilient flexible composition of matter comprising comminuted mica and an unvulcanized binder of elastic material with which the particles of mica are coated, said binder being present in amount only approximately sufficient to cause the particles of such comminuted mica to adhere to each other, such binder being adapted, at ordinary temperature, to form with the mica a resilient composition without the application of heat or vulcanization.

2. The herein described resilient flexible composition of matter comprising comminuted mica and an unvulcanized rubber binder applied to the particles of the comminuted mica, the amount of such binder being only sufficient to cause the particles of mica to adhere to each other.

CHARLES J. PATTON.

Witnesses:
A. M. LANE.
A. MABLE.